US010428659B2

(12) United States Patent
Hagan et al.

(10) Patent No.: US 10,428,659 B2
(45) Date of Patent: Oct. 1, 2019

(54) CROSSOVER HOLE CONFIGURATION FOR A FLOWPATH COMPONENT IN A GAS TURBINE ENGINE

(71) Applicant: United Technologies Corporation, Farmington, CT (US)

(72) Inventors: Benjamin F. Hagan, Winston-Salem, NC (US); Matthew A. Devore, Rocky Hill, CT (US); Dominic J. Mongillo, West Hartford, CT (US); Ryan Alan Waite, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 605 days.

(21) Appl. No.: 14/976,041

(22) Filed: Dec. 21, 2015

(65) Prior Publication Data

US 2017/0175539 A1  Jun. 22, 2017

(51) Int. Cl.
| F01D 5/18 | (2006.01) |
| F01D 9/04 | (2006.01) |
| F01D 25/12 | (2006.01) |
| F01D 25/24 | (2006.01) |

(Continued)

(52) U.S. Cl.
CPC ............ F01D 5/187 (2013.01); F01D 9/041 (2013.01); F01D 9/065 (2013.01); F01D 25/12 (2013.01); F01D 25/24 (2013.01); F02C 3/04 (2013.01); F05D 2220/32 (2013.01); F05D 2240/121 (2013.01); F05D 2240/303 (2013.01); F05D 2240/35 (2013.01); F05D 2250/232 (2013.01); F05D 2250/323 (2013.01);

(Continued)

(58) Field of Classification Search
CPC . F01D 5/187; F01D 5/18; F01D 9/065; Y02T 50/676; F05D 2260/201
See application file for complete search history.

(56) References Cited

U.S. PATENT DOCUMENTS

| 5,246,341 A | 9/1993 | Hall et al. |
| 5,827,043 A * | 10/1998 | Fukuda .................. F01D 5/187 |
| | | 415/115 |
| 6,416,275 B1 | 7/2002 | Itzel et al. |

(Continued)

FOREIGN PATENT DOCUMENTS

| EP | 1154124 | 11/2001 |
| EP | 2921650 | 9/2015 |

OTHER PUBLICATIONS

The Extended European Search Report for EP Application No. 16205997.6, dated May 5, 2017.

*Primary Examiner* — Steven M Sutherland
(74) *Attorney, Agent, or Firm* — Carlson, Gaskey & Olds, P.C.

(57) ABSTRACT

A flowpath component for a gas turbine engine includes a leading edge, a trailing edge connected to the leading edge via a first surface and a second surface, an impingement cavity internal to the flowpath component, the impingement cavity being aligned with one of the leading edge and the trailing edge, a cooling passage extending at least partially through the flowpath component, and a plurality of crossover holes connecting the cooling passage to the impingement cavity. At least one of the crossover holes is aligned normal to an expected direction of fluid flow through the cooling passage and is unaligned with an axial line drawn perpendicular to a stacking line of the flowpath component.

16 Claims, 4 Drawing Sheets

(51) Int. Cl.
*F02C 3/04* (2006.01)
*F01D 9/06* (2006.01)

(52) U.S. Cl.
CPC .. *F05D 2260/201* (2013.01); *F05D 2260/202* (2013.01); *F05D 2260/205* (2013.01); *Y02T 50/676* (2013.01)

(56) References Cited

U.S. PATENT DOCUMENTS

| | | | |
|---|---|---|---|
| 6,932,571 B2 * | 8/2005 | Cunha | F01D 5/18 |
| | | | 416/97 R |
| 6,969,233 B2 | 11/2005 | Powis et al. | |
| 7,008,185 B2 | 3/2006 | Peterman et al. | |
| 7,478,994 B2 | 1/2009 | Cunha et al. | |
| 7,837,441 B2 | 11/2010 | Spangler et al. | |
| 8,251,665 B2 * | 8/2012 | Baldauf | F01D 5/22 |
| | | | 416/193 A |
| 8,951,004 B2 | 2/2015 | Lee et al. | |
| 9,115,590 B2 | 8/2015 | Spangler et al. | |
| 2003/0086785 A1 | 5/2003 | Bunker et al. | |
| 2010/0310367 A1 * | 12/2010 | Devore | F01D 5/189 |
| | | | 416/1 |
| 2013/0280092 A1 | 10/2013 | Xu | |
| 2013/0315725 A1 | 11/2013 | Uechi et al. | |
| 2015/0226069 A1 | 8/2015 | Pearson et al. | |

\* cited by examiner

US 10,428,659 B2

CROSSOVER HOLE CONFIGURATION FOR A FLOWPATH COMPONENT IN A GAS TURBINE ENGINE

STATEMENT REGARDING FEDERALLY SPONSORED RESEARCH OR DEVELOPMENT

This invention was made with government support under contract number FA 8650-09-D-2923-0021 awarded by the United States Air Force. The government has certain rights in the invention.

TECHNICAL FIELD

The present disclosure relates generally to a flowpath component for a gas turbine engine, and more specifically to a configuration of cooling passage crossover holes for the same.

BACKGROUND

Gas turbine engines include a compressor that draws in and compresses air, a combustor that combines the compressed air with a fuel to create combustion products, and a turbine section across which the combustion products are expanded. The resultant combustion products are passed through the turbine section at extremely high temperatures, and the expansion of the combustion products across the turbine section drives the turbines to rotate.

As a result of the combustion, temperatures within the gas turbine engine can be extremely high. In particular, the temperatures within the flowpath at a turbine section inlet, and throughout the turbine section, are extremely high. In order to prevent damage to flowpath components (components that are disposed in, or exposed to, a primary flowpath), active cooling systems are included within the flowpath components. The active cooling can include cooling passages that pass through the flowpath component and utilize convective cooling, impingement cavities within the flowpath component that utilize impingement cooling, film cooling via film cooling holes in the flowpath component, or any combination of the above.

SUMMARY OF THE INVENTION

In one exemplary embodiment, a flowpath component for a gas turbine engine includes a leading edge, a trailing edge connected to the leading edge via a first surface and a second surface, an impingement cavity internal to the flowpath component, impingement cavity being aligned with one of the leading edge and the trailing edge, a cooling passage extending at least partially through the flowpath component, a plurality of crossover holes connecting the cooling passage to the impingement cavity, and at least one of the crossover holes being aligned normal to an expected direction of fluid flow through the cooling passage and being unaligned with an axial line drawn perpendicular to a stacking line of the flowpath component.

In another exemplary embodiment of the above described flowpath component for a gas turbine engine, the flowpath component at least partially radially spans a flowpath in an installed configuration.

In another exemplary embodiment of any of the above described flowpath components for a gas turbine engine, the flowpath component is one of a blade a vane, and a mid-turbine frame.

In another exemplary embodiment of any of the above described flowpath components for a gas turbine engine, an expected direction of fluid flow within the cooling passage includes one of an axial to radial flow bend and a radial to axial flow bend.

In another exemplary embodiment of any of the above described flowpath components for a gas turbine engine, the expected direction of fluid flow includes an axial to radial bend and a radial to axial bend.

In another exemplary embodiment of any of the above described flowpath components for a gas turbine engine, at least one of the crossover holes is disposed at one of approximately 0% span and approximately 100% span.

In another exemplary embodiment of any of the above described flowpath components for a gas turbine engine, a cross section of the at least one crossover holes is tapered such that a flow of fluid through the crossover hole is accelerated.

In another exemplary embodiment of any of the above described flowpath components for a gas turbine engine, at least one of the crossover holes includes an angular component aligned with the stacking line of the flowpath component.

In another exemplary embodiment of any of the above described flowpath components for a gas turbine engine, the leading edge of the flowpath component is curved.

In another exemplary embodiment of any of the above described flowpath components for a gas turbine engine, a leading edge side of the impingement cavity comprises a curve complimentary to the curve of the leading edge of the flowpath component.

In another exemplary embodiment of any of the above described flowpath components for a gas turbine engine, the leading edge of the flowpath component is connected to the impingement cavity by a plurality of film cooling holes.

In one exemplary embodiment a gas turbine engine includes a compressor section, a combustor section fluidly connected to the compressor section via a primary flowpath, a turbine section fluidly connected to the combustor section via the primary flowpath, at least one flowpath component disposed in, and at least partially spanning, the primary flowpath. The at least one flowpath component including an internal cooling system having at least one cooling fluid passage, at least one impingement cavity, and a plurality of crossover holes connecting the at least one cooling fluid passage to the at least one impingement cavity, at least one of the crossover holes including a radially aligned angular component.

In another exemplary embodiment of the above described gas turbine engine, the at least one flowpath component includes one of a vane, a blade, and a mid-turbine frame.

In another exemplary embodiment of any of the above described gas turbine engines, the at least one crossover holes including a radially aligned angular component are aligned approximately normal to an expected fluid flow direction through the cooling fluid passage.

In another exemplary embodiment of any of the above described gas turbine engines, at least one crossover hole in the plurality of crossover holes includes an inlet of a first size and an outlet of a second size, with the second size being smaller than the first size, such that a flow of fluid through the crossover hole is accelerated.

In another exemplary embodiment of any of the above described gas turbine engines, a leading edge of the at least one flowpath component is curved, and wherein an edge of the impingement cavity within the at least one flowpath component that is adjacent to the leading edge of the flowpath component includes a complimentary curve.

In another exemplary embodiment of any of the above described gas turbine engines, the at least one flowpath component further comprises a plurality of film cooling holes connecting the impingement cavity to the leading edge of the at least one flowpath component.

In another exemplary embodiment of any of the above described gas turbine engines, the cooling fluid passage of at least one flowpath component includes one of an axial to radial bend at an outer diameter end of the flowpath component and a radial to axial bend at an inner diameter end of the flowpath component.

An exemplary method for cooling a flowpath component includes passing a cooling fluid through the flowpath component along a cooling fluid passage and transmitting at least a portion of the cooling fluid from the cooling fluid passage to an impingement cavity via a plurality of crossover holes, wherein the crossover holes are oriented at least approximately normal to an expected flow of fluid through the cooling fluid passage, and wherein the expected flow of fluid through the cooling fluid passage includes at least one axially aligned portion and at least one radially aligned portion.

A further example of the above described exemplary method for cooling a flowpath component includes transmitting at least a portion of the cooling fluid passage to an impingement cavity via a plurality of crossover holes comprises transmitting cooling fluid to at least one dead zone within the impingement cavity.

These and other features of the present invention can be best understood from the following specification and drawings, the following of which is a brief description.

DETAILED DESCRIPTION OF AN EMBODIMENT

Figure 1:
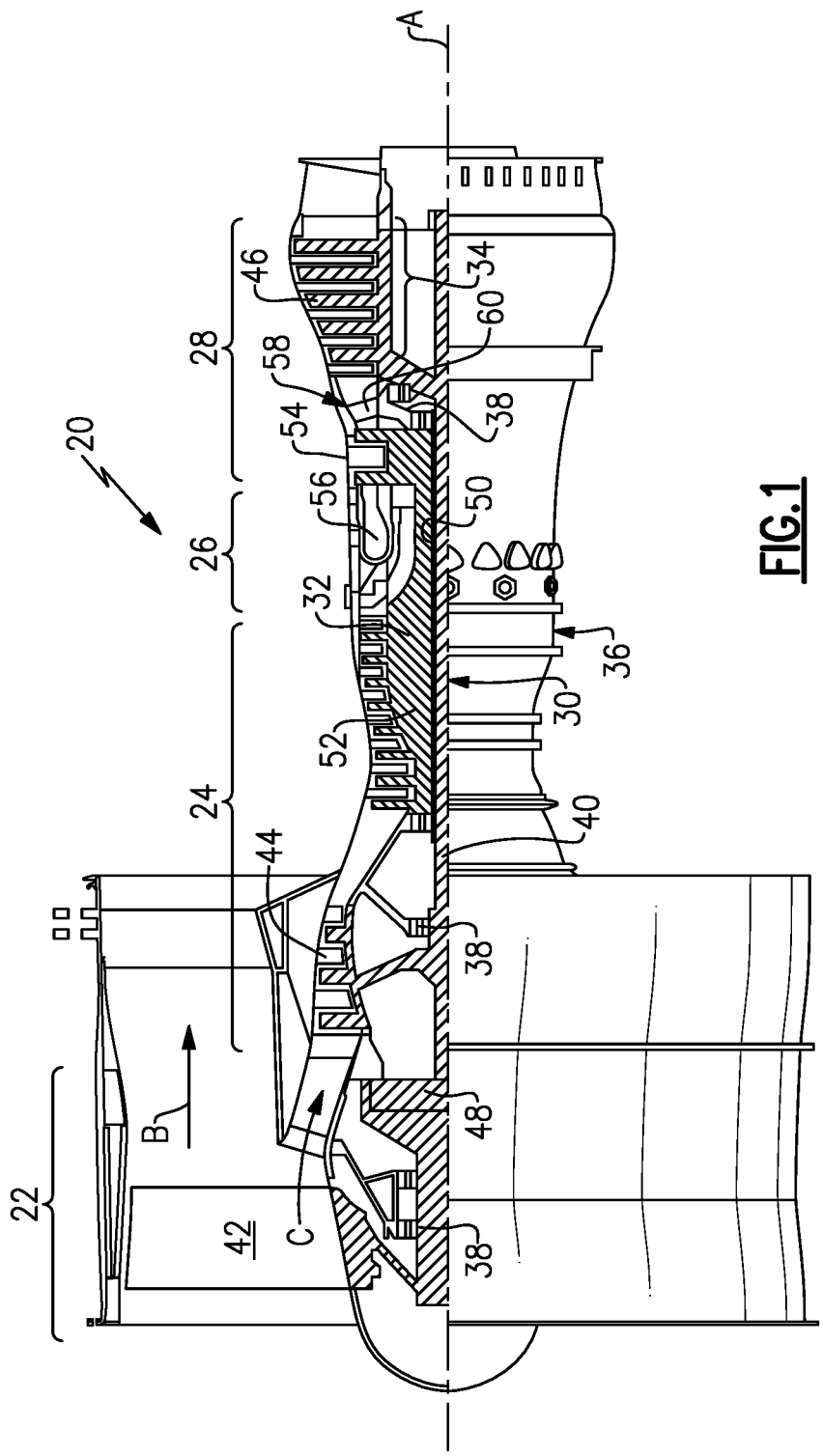
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

Figure 2:
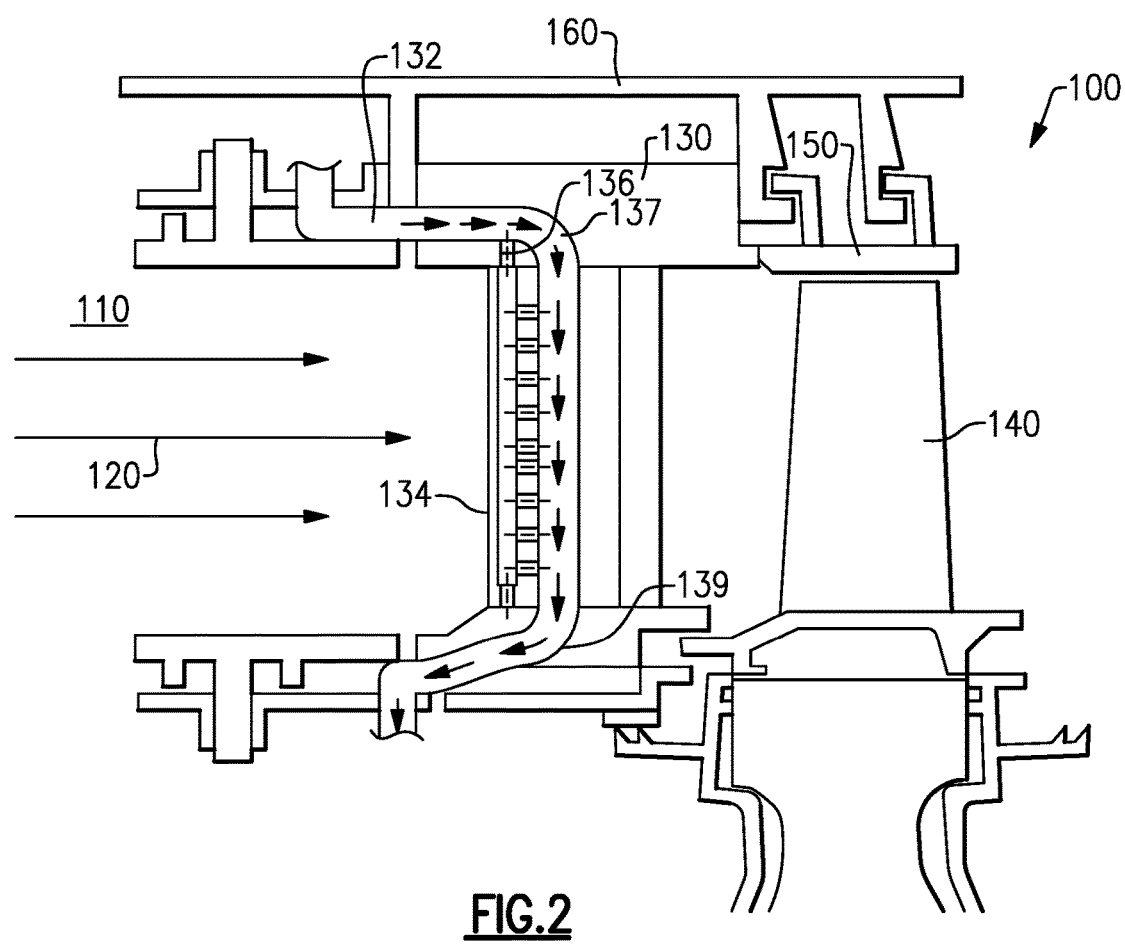
FIG. 2 schematically illustrates an exemplary turbine section inlet for a gas turbine engine.

With continued reference to FIG. 1, FIG. 2 schematically illustrates an inlet section 100 of a turbine section of a gas turbine engine, such as the exemplary gas turbine engine 20 described above. An outlet 110 of a combustion section provides combustion products to the turbine inlet section 100 along a flowpath 120. The flowpath 120 is alternately referred to as the primary flowpath 120. In the exemplary turbine inlet section 100, a flow correcting vane 130 spans from an inner diameter of the flowpath 120 (0% span) to an outer diameter of the flowpath 120 (100% span). Downstream of the vane 130 is a blade 140. The blade 140 spans less than 100% of the flowpath 120, and is driven to rotate by expansion of the combustion products in the flowpath 120. The blade 140 is supported by a disk 142. Radially outward of the blade 140 is a blade outer air seal (BOAS) 150. The BOAS 150 and the vane 130 are supported via an engine case 160 at an outer diameter of the flowpath 120. Each of the vane 130, the blade 140 and the BOAS 150 are exposed to combustion products flowing through the flowpath 120 and are referred to as flowpath components. In alternative examples additional components, such as a midturbine frame, can also be exposed to the flowpath and are similarly referred to as flowpath components.

In order to actively cool the vane 130, a cooling system is included within the vane 130. The cooling system illustrated and described herein is exaggerated in size for illustrative purposes and is not drawn to scale. The cooling system includes a cooling fluid passage 132 that passes cooling fluid through the vane 130. As the cooling fluid passes through the vane 130, the cooling fluid convectively cools the vane 130. The cooling system also includes an impingement cavity 134 connected to the cooling fluid passage 132 via multiple crossover holes 136. A portion of the cooling fluid passing through the cooling fluid passage 132 passes through the crossover holes 136 and impinges on a leading edge side of the impingement cavity 134, generating an impingement cooling effect.

Each of the crossover holes 136 is aligned approximately normal to an expected direction of fluid flow through the cooling fluid passage 132. The majority of the crossover holes are also aligned with a primary axis of the gas turbine engine 20. The crossover holes 136 turn the flow of the cooling fluid through the cooling fluid passage 132 by 90 degrees and create a higher heat transfer within the impingement cavity 134 thereby increasing the thermal cooling effectiveness. While illustrated herein as being at an angle relative to the walls of the impingement cavity 150, and the cooling fluid passage 132, one of skill in the art will appreciate that the joint between the crossover hole and the walls of the impingement cavity 150 or the cooling fluid passage 132 can be filleted, or rounded in some examples.

Due to gas turbine engine hardware and cooling fluid source considerations, an inlet portion 137 of the cooling fluid passage 132 is not oriented radially relative to the gas turbine engine 20 in some examples. An alternative means of expressing this alignment is that the cooling fluid passage 132, at the inlet portion 137, is not aligned with a stacking line of the flow path component. In the illustrated example of FIG. 2, the inlet portion 137 is oriented axially. In alternative examples, the inlet portion 137 is oriented at an angle between a full radial alignment and a full axial alignment. These orientations are referred to as having an axially aligned component.

In addition to axially aligned crossover holes 136 along the majority of the cooling fluid passage 132, the example cooling system includes crossover holes 136 at the inlet portion 137, where the cooling fluid passage 132 includes an axially aligned component. In order for the crossover hole 136 to redirect the cooling fluid flow by 90 degrees, as described above, a crossover hole 136 including a radially aligned component is included at the axially aligned portion of the cooling fluid passage 132. In the illustrated example of FIG. 2, an outlet portion 139 similarly includes an axially aligned portion of the cooling fluid passage 132. As with the inlet portion 137, a crossover hole 136 is disposed at the inner diameter of the vane 130 and includes a radially aligned component.

The example of FIG. 2 includes exaggerated angles of the cooling fluid passage 132 inlet portion 137 and outlet portion 139. In a practical example, crossover holes 136 at the inlet and at the outlet of the cooing fluid passage 132 may not be exactly radially aligned with the engine, but rather are aligned normal to an expected direction of fluid flow through the cooling fluid passage 132.

In alternative examples, similar crossover holes and cooling fluid passages can be included in the blade 140, or in any other flowpath components that span, or partially span, the primary flowpath 120.

Figure 3:
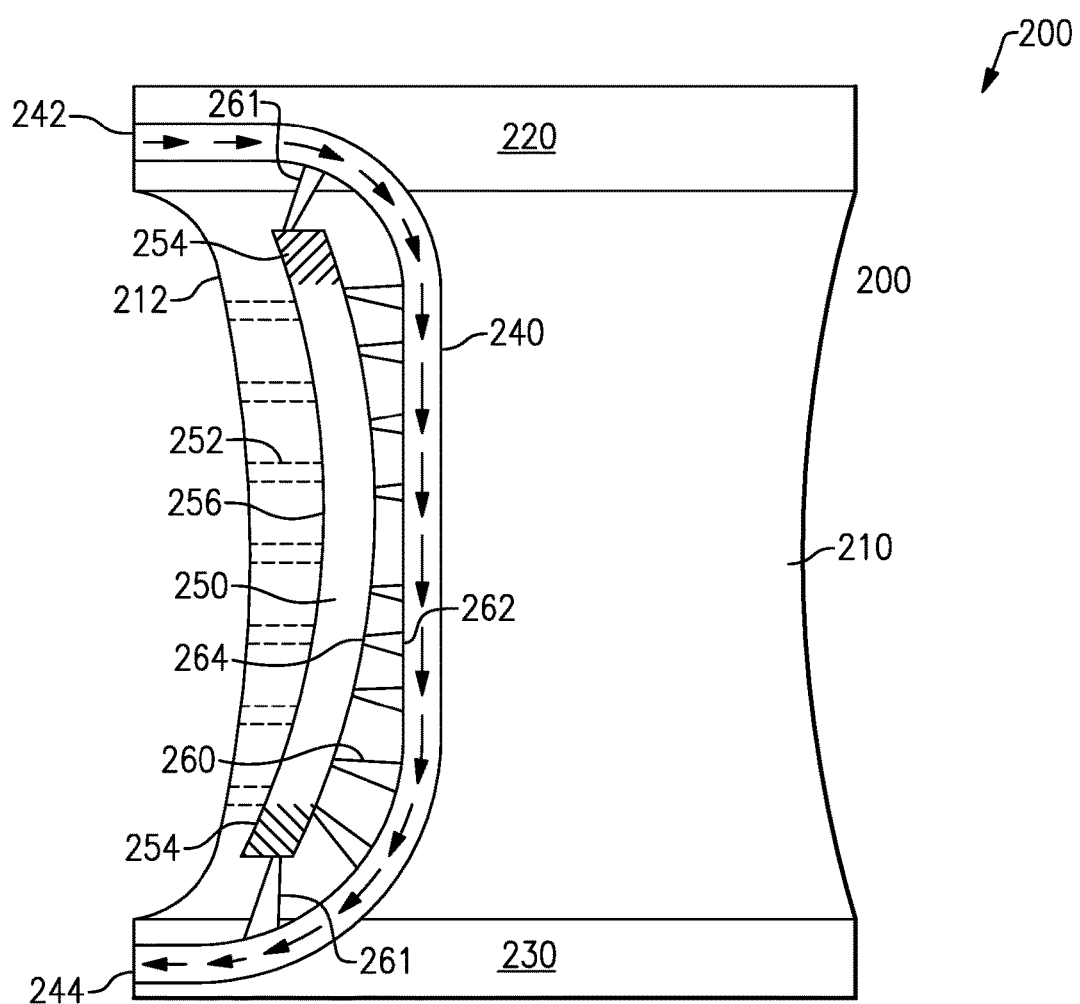
FIG. 3 schematically illustrates an exemplary flowpath component of a gas turbine engine isolated from the gas turbine engine.
Figure 4:
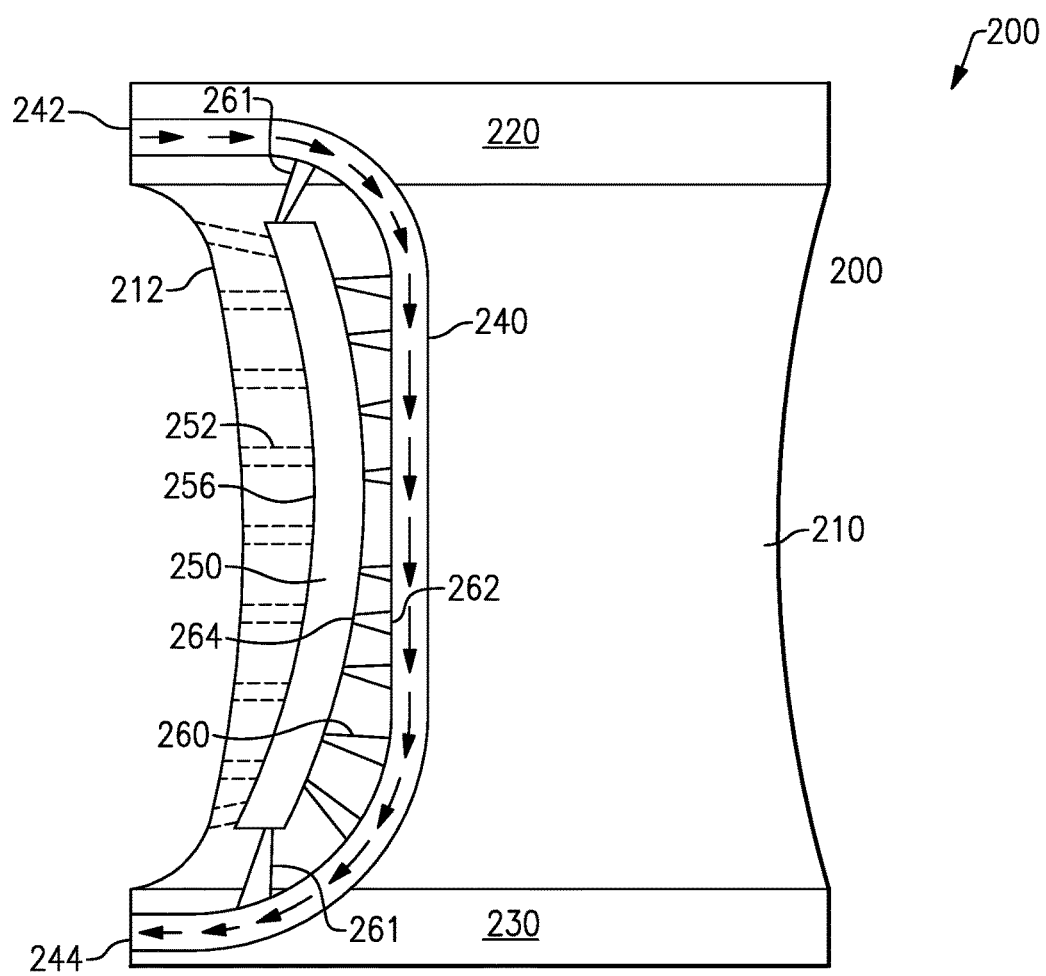
FIG. 4 schematically illustrates an exemplary flowpath component of a gas turbine engine isolated from the gas turbine engine.

With continued reference to FIG. 2, FIG. 3 schematically illustrates a cross section of a vane 200 including the radially aligned crossover hole configuration described above. Similarly, FIG. 4 schematically illustrates the cross section of the vane 200, with the further addition of film cooling holes 353 at the outer diameter edge of an impingement cavity 250 and at the inner diameter edge of the impingement cavity 250. The vane 200 is isolated from the surrounding structure of the gas turbine engine 20. The vane 200 includes a flowpath spanning portion 210, an outer diameter portion 220 and an inner diameter portion 230. In some examples, the flowpath spanning portion 210 is a flow correcting airfoil shape. The outer diameter portion 220 is supported by an outer diameter engine case, and the inner diameter portion 230 is supported by an inner diameter case section.

A cooling fluid passage 240 passes through the vane 200 and convectively cools the vane 200. An inlet 242 of the cooling fluid passage 240 is disposed at the outer diameter portion 220, and includes an axially aligned fluid flow relative to an axis of the gas turbine engine in which the vane 200 is installed. Similarly, an outlet 244 is disposed at the inner diameter portion 230, and includes an axially aligned fluid flow relative to the axis of the gas turbine engine. Immediately downstream of the inlet 242, the cooling fluid passage 240 curves toward a radial flow orientation. Similarly, immediately upstream of the outlet 244 the cooling fluid passage 240 curves from a radial orientation to an axial orientation.

Also included in the flowpath spanning portion 210 is an impingement cavity 250. Cooling fluid from the cooling fluid passage 240 is directed into the impingement cavity 250 via multiple crossover holes 260. Each of the crossover holes 260 includes an inlet portion 262 connected to the cooling fluid passage 240 and an outlet portion 264 connected to the impingement cavity 250.

In the example of FIG. 3, each inlet portion 262 of the crossover holes 260 is larger than the corresponding outlet portion 264 of the crossover holes 262. This creates a tapered crossover hole 262. The tapering accelerates the flow of the cooling fluid through the crossover hole 260, and increases the impingement cooling effect. In alternative examples, the inlet 262 and the outlet 264 of each of the crossover holes 260 can be the same size, and no flow acceleration occurs within the crossover holes 260. In yet further examples, the inlet portion 262 can be smaller than the outlet portion 260, resulting in a flow deceleration through the crossover hole 262. By way of example, the inner diameter and outer diameter crossover holes of FIG. 4 can, in some examples, utilize this decelerating construction.

To further increase cooling of the flowpath spanning portion 210, the impingement cavity 250 is connected to a leading edge 212 of the flowpath spanning portion 210 via multiple film cooling holes 252. The film cooling holes 252 output the cooling fluid into the primary flowpath, and provide a protective film of cooled air along the surface of the flowpath spanning portion 210. In alternate examples, the film cooling holes 252 can be omitted, and the cooling fluid can exit the impingement cavity 250 via any other known means.

The majority of the crossover holes 260 are axially aligned with the axis of the gas turbine engine, and are approximately normal to an expected flow direction of fluid through the cooling fluid passage 240. At the bends adjacent to the inlet 242 and the outlet 244, the crossover holes 261 include an angular component aligned with the radius of the gas turbine engine. These crossover holes are referred to herein as radial crossover holes 261. Absent the radial crossover holes 261, the impingement cavity 250 includes local regions where the effect of impingement cooling flow and backside convective heat transfer is minimal. These regions are shaded in the illustration of FIG. 3, and are referred to as "stagnated flow zones" 254. In the stagnated flow zones 254 the local cooling flow velocity is approximately zero and does not provide active backside convective cooling, resulting in locally high metal temperatures that reduce both the thermos-mechanical capability of the metal alloy. By including the radial crossover holes 261, cooling fluid from the cooling fluid passage 240 can be directed into the stagnated flow zones 254, thereby increasing the local convective heat transfer of the impingement cavity 250 in the stagnated flow zones 254, and thus increasing the local thermal cooling effectiveness.

Further, the addition of the radial crossover holes 261 allows the impingement cavity 250 to be shaped with a curved leading edge 256 as illustrated in FIG. 3. The curved leading edge 256 of the impingement cavity 250 increases the size of the stagnated flow zones 254, and decreases the amount of local convective cooling that occurs within the local stagnated flow zones 254 absent the radial crossover holes 261. In some examples, the increased stagnated flow zones 254 render an internal cooling configuration lacking the radial crossover holes 261 unsuitable for providing sufficient local convective cooling. By incorporating local radial cross over holes 261, the leading edge of the impingement cavity 250 can be curved to follow the external metal contour of the leading edge airfoil-platform fillet regions 212 and provide a significant increase in local backside convective heat transfer through the local impingement cooling flow.

As mentioned previously, the curved leading edge impingement cavity 250 reduces the local thermal resistance length (metal wall thickness) between the hot gas side surface and the internal cooling surface adjacent to the curved leading edge impingement cavity 250. The locally curved leading edge impingement cavity 250, significantly increases the local through wall conduction heat transfer required to reduce local leading edge airfoil-platform fillet metal temperatures 212, resulting in increased thermal-mechanical oxidation and thermal mechanical fatigue capability. The curvature of the leading edge 256 of the impingement cavity 250 allows the leading edge 212 of the flowpath component to be curved, the advantages and benefits of which can be appreciated by one of skill in the art.

In the case of a film cooled leading edge configuration, as illustrated in FIG. 4, the incorporation of radial cross over holes 261 also serves as a conduit by providing additional cooling flow at higher pressure levels in order to supply local film cooling holes 252. In particular, the higher pressure levels allow the inclusion of the film cooling holes 252 positioned at the outer diameter and at the inner diameter of the impingement cavity 250. The radial flow cross overs holes 261, may be sized and oriented relative to cooling cavity 240 in order to minimize internal pressure loss and maximize the local upstream feed pressure of the leading edge showerhead film cooling holes 252. Provision of higher source pressure to leading edge film cooling hole 252 ensures that a positive out flow condition exists for all engine operating conditions. The local positive out flow across the leading edge film cooling holes 252 guarantees optimal film hole convective cooling and local film cooling required to reduce locally high heat flux observed at the stagnation region of the external airfoil-platform leading edge surface.

While illustrated in FIGS. 2 and 3 as individual crossover holes 260, 261 at each span, one of skill in the art, having the benefit of this disclosure, will appreciate that multiple crossover holes 260, 261 can be disposed at any given span, depending on the circumferential width of the flowpath component. Further, while illustrated in FIGS. 2 and 3 as being approximately parallel to the radius of the gas turbine engine, one of skill in the art, having the benefit of this disclosure will appreciate that the radial crossover holes 261 can include inlets 262 at any point in the bend from axial flow to radial flow, or the bend from radial flow to axial flow, thereby creating angled crossover holes 261 having a radially aligned component and an axially aligned component.

With continued reference to FIGS. 2 and 3, the cooling systems illustrated in FIGS. 2 and 3 are illustrated within a vane. The cooling systems are equally applicable to, and usable in, rotating components such as blades, as well as other components that span or partially span a flowpath in a gas turbine engine. By way of example, when the cooling system is incorporated in a blade, the inlet of the cooling passage is positioned at an inner diameter edge, and there will be no outlet to the outer diameter. As such, the radially aligned crossover holes are positioned only at the inner diameter.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A flowpath component for a gas turbine engine comprising:
    a leading edge;
    a trailing edge connected to the leading edge via a first surface and a second surface;
    an impingement cavity internal to the flowpath component, the impingement cavity being aligned with one of the leading edge and the trailing edge and including at least one stagnated flow zone;
    a cooling passage extending at least partially through the flowpath component and including at least one of an axial to radial flow bend, relative to an axis defined by the gas turbine engine, and a radial to axial bend, relative to the axis defined by the gas turbine engine;
    a plurality of crossover holes connecting said cooling passage to said impingement cavity;

at least one crossover hole of said plurality of crossover holes being aligned normal to an expected direction of fluid flow through said cooling passage;

at least one crossover hole of said plurality of crossover holes being disposed at the at least one of the axial to radial flow bend and the radial to axial flow bend and configured to direct cooling flow from the cooling passage into the at least one stagnated flow zone;

wherein the at least one crossover hole of said plurality of crossover holes includes an outlet connected to one of a radially innermost end of the impingement cavity, relative to a radius of the gas turbine engine, and a radially outermost end of the impingement cavity, relative to the radius of the gas turbine engine; and wherein each stagnated flow zone in the at least one stagnated flow zone is a local region where an effect of impingement cooling flow and backside convective heat transfer is minimal absent an effect of the at least one crossover hole disposed at the at least one of the axial to radial flow bend and the radial to axial flow bend.

2. The flowpath component of claim 1, wherein the flowpath component at least partially spans a flowpath in an installed configuration.

3. The flowpath component of claim 2, wherein the flowpath component is one of a blade and a vane.

4. The flowpath component of claim 1, wherein the expected direction of fluid flow includes the axial to radial bend and the radial to axial bend.

5. The flowpath component of claim 1, wherein the at least one of said at least one crossover hole is disposed at at least one of 0% span and 100% span.

6. The flowpath component of claim 1, wherein a cross section of each crossover hole of the at least one crossover hole is tapered such that a flow of fluid through each crossover hole is accelerated.

7. The flowpath component of claim 1, wherein the leading edge of the flowpath component is curved.

8. The flowpath component of claim 1, wherein the leading edge of the flowpath component is connected to the impingement cavity by a plurality of film cooling holes.

9. The flowpath component of claim 1, wherein the at least one crossover hole of said plurality of crossover holes includes an inlet connected to the one of the axial to radial flow bend and the radial to axial flow bend.

10. A gas turbine engine comprising:
a compressor section;
a combustor section fluidly connected to the compressor section via a primary flowpath;
a turbine section fluidly connected to the combustor section via the primary flowpath;
at least one flowpath component disposed in, and at least partially spanning, the primary flowpath;
the at least one flowpath component including an internal cooling system having at least one cooling fluid passage including at least one of an axial to radial flow bend, relative to an axis defined by the gas turbine engine, and a radial to axial bend, relative to the axis defined by the gas turbine engine, at least one impingement cavity including at least one stagnated flow zone, and a plurality of crossover holes connecting the at least one cooling fluid passage to the at least one impingement cavity, at least one crossover hole of the plurality of crossover holes including a centerline, wherein the centerline is not normal to an axis defined by the gas turbine engine, and at least one crossover hole of the plurality of crossover holes being disposed at the at least one of the axial to radial flow bend and the radial to axial flow bend and configured to direct cooling flow from the cooling passage into the at least one stagnated flow zone;

wherein the at least one crossover hole of the plurality of crossover holes includes an outlet connected to one of a radially innermost end of the impingement cavity, relative to a radius of the gas turbine engine, and a radially outermost end of the impingement cavity, relative to the radius of the gas turbine engine; and wherein each stagnated flow zone in the at least one stagnated flow zone is a local region where an effect of impingement cooling flow and backside convective heat transfer is minimal absent an effect of the at least one crossover hole disposed at the at least one of the axial to radial flow bend and the radial to axial flow bend.

11. The gas turbine engine of claim 10, wherein the at least one flowpath component includes one of a vane, a blade, and a mid-turbine frame.

12. The gas turbine engine of claim 10, wherein the at least one crossover hole including the centerline is aligned normal to an expected fluid flow direction through the at least one cooling fluid passage.

13. The gas turbine engine of claim 10, wherein at least one crossover hole including the centerline further includes an inlet of a first size and an outlet of a second size, with the second size being smaller than the first size, such that a flow of fluid through the at least one crossover hole including the centerline is accelerated.

14. The gas turbine engine of claim 10, wherein the at least one flowpath component further comprises a plurality of film cooling holes connecting the impingement cavity to a leading edge of the at least one flowpath component.

15. The gas turbine engine of claim 10, wherein the cooling fluid passage of at least one flowpath component includes one of an axial to radial bend at an outer diameter end of the flowpath component, relative to the axis defined by the gas turbine engine, and a radial to axial bend at an inner diameter end of the flowpath component, relative to the axis defined by the gas turbine engine.

16. The gas turbine engine of claim 15, wherein the at least one crossover hole of the plurality of crossover holes including the centerline includes an inlet connected to one of the radial to axial bend and the axial to radial bend.

* * * * *